US011820262B2

(12) United States Patent
Fang

(10) Patent No.: US 11,820,262 B2
(45) Date of Patent: Nov. 21, 2023

(54) CHILD SAFETY SEAT

(71) Applicant: BAMBINO PREZIOSO SWITZERLAND AG, Steinhausen (CH)

(72) Inventor: Ganqing Fang, Guangdong (CN)

(73) Assignee: Bambino Prezioso Switzerland AG, Steinhausen (CH)

( * ) Notice: Subject to any disclaimer, the term of this patent is extended or adjusted under 35 U.S.C. 154(b) by 31 days.

(21) Appl. No.: 17/556,023

(22) Filed: Dec. 20, 2021

(65) Prior Publication Data

US 2022/0203871 A1  Jun. 30, 2022

(30) Foreign Application Priority Data

Dec. 25, 2020 (CN) .......................... 202023196815.1

(51) Int. Cl.
*B60N 2/28* (2006.01)
*B60N 2/30* (2006.01)

(52) U.S. Cl.
CPC .......... *B60N 2/2851* (2013.01); *B60N 2/2872* (2013.01); *B60N 2/309* (2013.01); *B60N 2205/35* (2013.01)

(58) Field of Classification Search
CPC ..... B60N 2/2851; B60N 2/2872; B60N 2/309
USPC .................................................... 297/256.11
See application file for complete search history.

(56) References Cited

U.S. PATENT DOCUMENTS

| | | | |
|---|---|---|---|
| 2010/0060054 A1* | 3/2010 | Chen ............... | B60N 2/2875 297/256.1 X |
| 2010/0060055 A1* | 3/2010 | Chen ............... | B60N 2/2875 297/256.11 X |
| 2011/0062756 A1 | 3/2011 | Campbell et al. | |

FOREIGN PATENT DOCUMENTS

| | | |
|---|---|---|
| CN | 202439584 U | 9/2012 |
| CN | 104129329 A | 11/2014 |
| DE | 10 2006 043 760 B4 | 6/2008 |
| DE | 10 2008 002 822 A1 | 11/2009 |
| DE | 10 2014 100 380 B4 | 7/2017 |
| DE | 10 2017 119 698 B4 | 9/2020 |

OTHER PUBLICATIONS

Taiwanese Office Action issued in corresponding Taiwanese Application No. 110147628, dated Dec. 2, 2022, pp. 1-12.
German Office Action issued in corresponding German Patent Application No. 102021133810.7, dated Mar. 30, 2023, pp. 1-8.

* cited by examiner

Primary Examiner — Anthony D Barfield
(74) Attorney, Agent, or Firm — Hauptman Ham, LLP

(57) ABSTRACT

A child safety seat includes a seat portion and a backrest portion connected with each other, a headrest slidably connected with the backrest portion, a first and a second side support connected with the backrest portion and respectively protruding forward from the backrest portion at two sides thereof, the first and second side supports being configured to be movable relative to the backrest portion for modifying a transversal distance between the first side support and the second side support, and a linking mechanism adapted to movably link each of the first and second side supports to the headrest so that the headrest and the first and second side supports are movable concurrently relative to the backrest portion for adjustment.

18 Claims, 5 Drawing Sheets

CHILD SAFETY SEAT

CROSS-REFERENCE TO RELATED APPLICATION(S)

This application claims priority to China patent application no. 202023196815.1 filed on Dec. 25, 2020.

BACKGROUND

1. Field of the Invention

The present invention relates to child safety seats.

2. Description of the Related Art

A child safety seat is generally used in a vehicle to provide protection and reduce the impact of accidental collision on a child. The child safety seat typically includes a seat portion, a backrest portion having two sidewalls respectively protruding forward at a left and a right side thereof, and a headrest movable along the backrest portion for height adjustment. Conventionally, the two sidewalls are fixedly attached to the backrest portion and cannot be conveniently adjusted in accordance with the size of a child placed in the child safety seat. As a result, the two sidewalls of the backrest portion may not be always adapted to provide suitable side support for a child. Moreover, a child safety seat having the aforementioned arrangement has a greater volume, which may not be convenient for transport or storage.

SUMMARY

The present application describes a child safety seat that has adjustable side supports and can address at least the foregoing issues.

According to an embodiment, the child safety seat includes a seat portion and a backrest portion connected with each other, a headrest slidably connected with the backrest portion, a first and a second side support connected with the backrest portion and respectively protruding forward from the backrest portion at two sides thereof, the first and second side supports being configured to be movable relative to the backrest portion for modifying a transversal distance between the first side support and the second side support, and a linking mechanism adapted to movably link each of the first and second side supports to the headrest so that the headrest and the first and second side supports are movable concurrently relative to the backrest portion for adjustment.

DETAILED DESCRIPTION OF THE EMBODIMENTS

Figure 1:
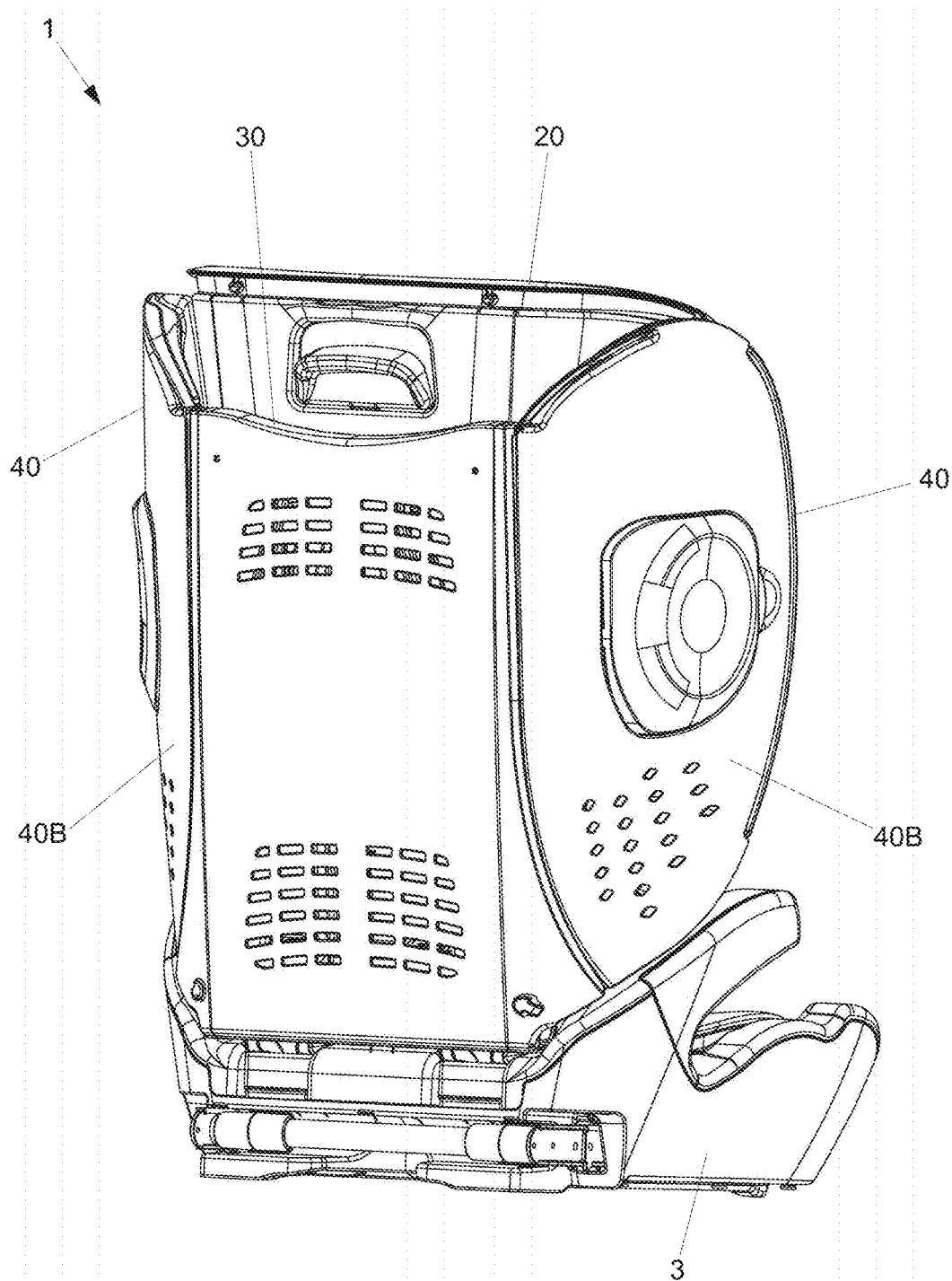
FIG. 1 is a perspective view illustrating an embodiment of a child safety seat.

FIG. 1 is a perspective view illustrating an embodiment of a child safety seat 1. The child safety seat 1 includes a seat portion 3, a backrest portion 30, a headrest 20 and two side supports 40. The seat portion 3 and the backrest portion 30 are connected with each other and form a seat suitable for receiving a child. The two side supports 40 are connected with the backrest portion 30, and respectively protrude forward from the backrest portion 30 at a left and a right side thereof. The seat portion 3, the backrest portion 30 and the two side supports 40 can thereby at least partially delimit a receiving space for seating a child.

The headrest 20 is slidably connected with the backrest portion 30, and can move vertically along the backrest portion 30 for adjustment in accordance with the height of a child placed in the child safety seat 1. For example, the headrest 20 may be adjusted between a lower position where the headrest 20 substantially lies within an interior of the child safety seat 1 between the two side supports 40, and a higher position where the headrest 20 extends above the top of the backrest portion 30. A lower position of the headrest 20 can provide suitable support for a child of a smaller size, and a higher position of the headrest 20 can provide suitable support for a child of a greater size. Once the headrest 20 is disposed at a desired height, a headrest locking mechanism (not shown) provided in the child safety seat 1 can lock the headrest 20 to the backrest portion 30. Headrest locking mechanisms are known in the art, the description of which is omitted herein for the sake of brevity.

Figure 2:
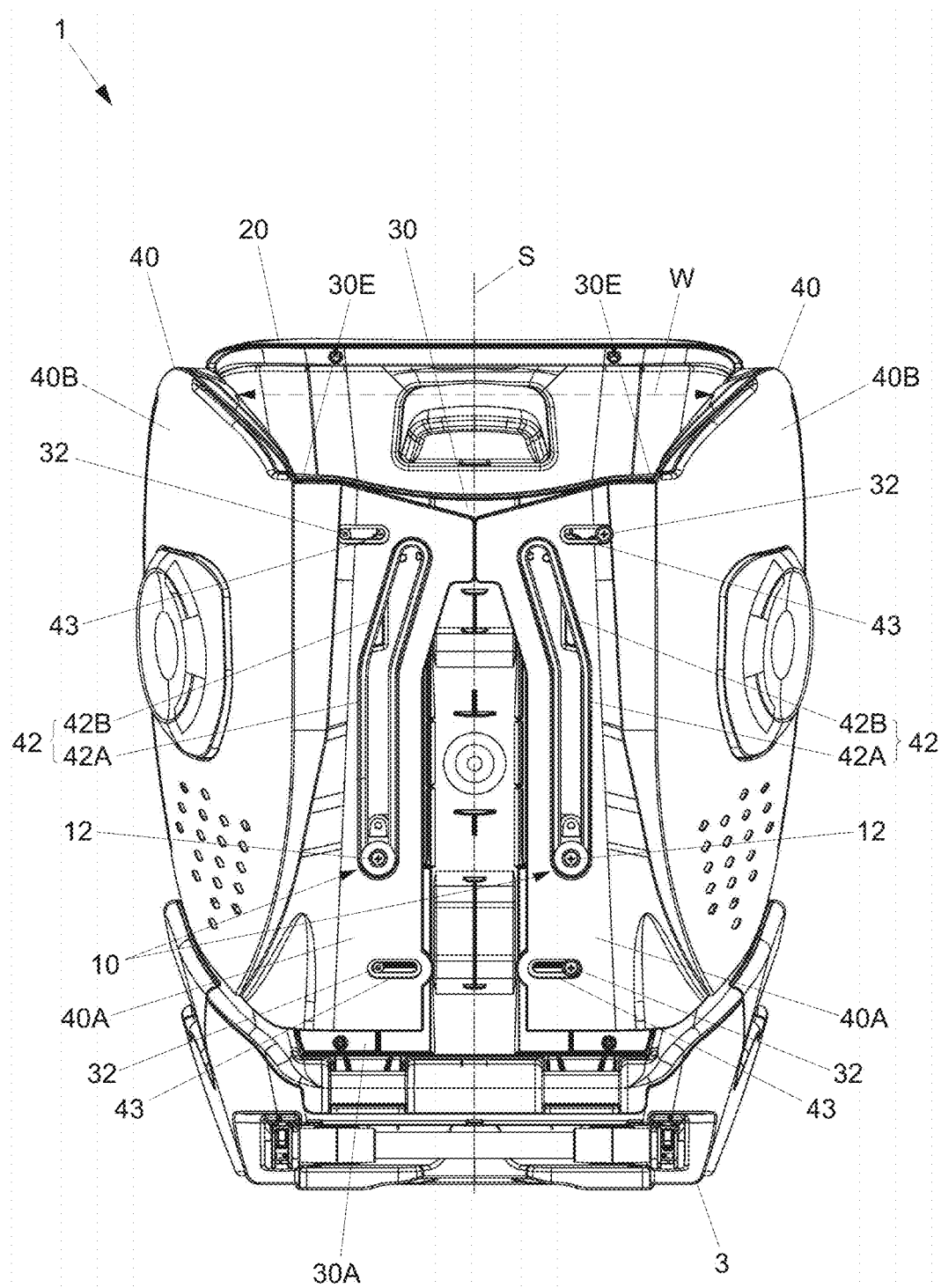
FIG. 2 is a schematic view illustrating some construction details of the child safety seat including a linking mechanism adapted to movably link two side supports at two sides of a backrest portion to a headrest.
Figure 3:
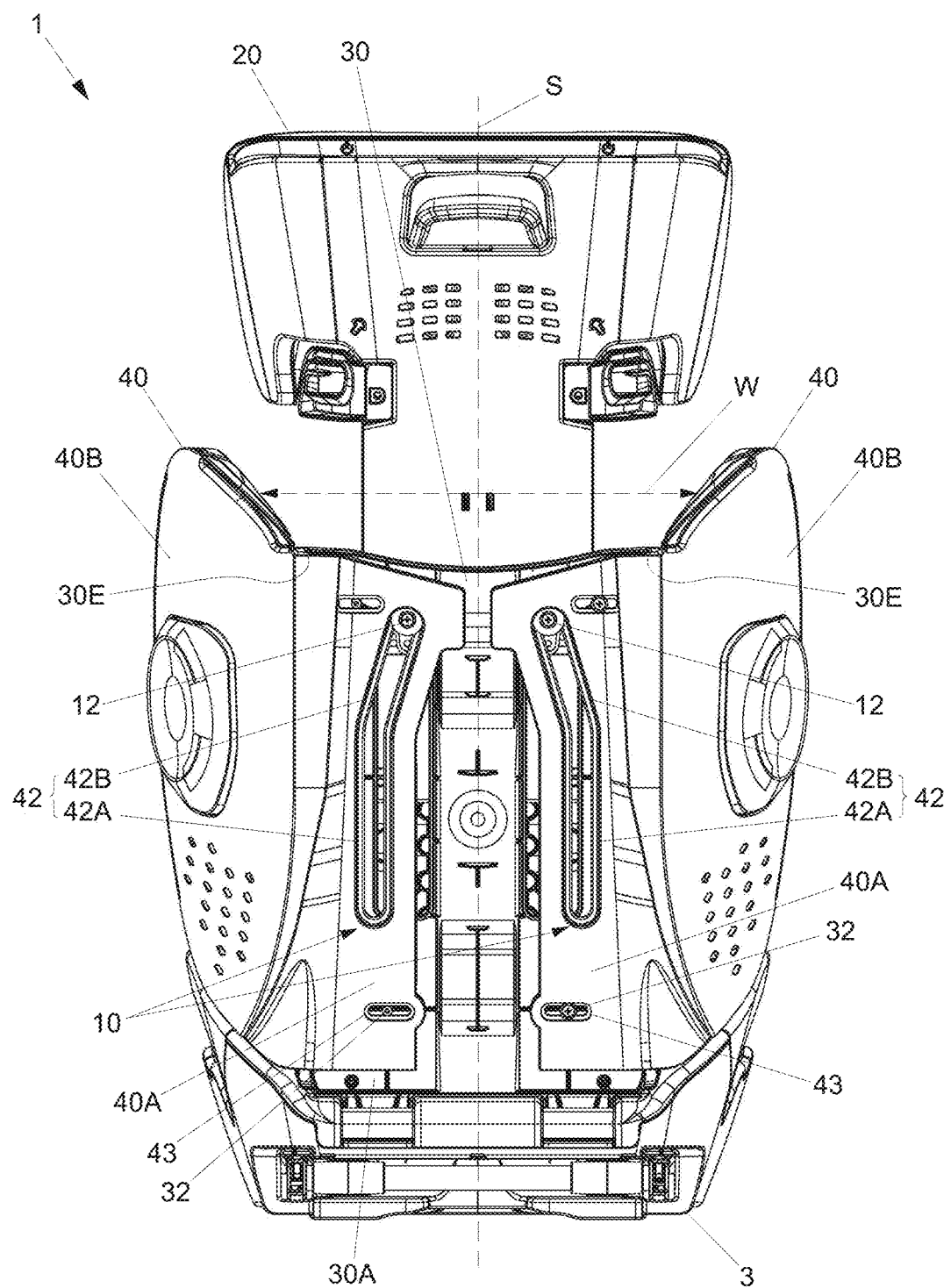
FIG. 3 is a schematic view illustrating the linking mechanism shown in FIG. 2 with the headrest arranged at a highest position.

In conjunction with FIG. 1, FIGS. 2 and 3 are schematic views illustrating further construction details of the child safety seat 1. Referring to FIGS. 1-3, the two side supports 40 can assist in limiting sideways movement of a child sitting on the child safety seat 1. In this regard, the two side supports 40 may have any suitable dimensions for providing sideways restraint. For example, each of the two side supports 40 may extend from a top of the backrest portion 30 to a bottom of the backrest portion 30. It will be appreciated, however, that the extent of the side supports 40 along the left and right side of the backrest portion 30 may be modified as needed.

The two side supports 40 are configured to be movable relative to the backrest portion 30 for modifying a transversal distance W between the two side supports 40. The transversal distance W can be exemplarily a horizontal distance that transversally separates the two side supports 40 in front of the backrest portion 30. The ability to modify the transversal distance W between the two side supports 40 allows to adjust a width of the receiving space of the child safety seat 1 in accordance with the size of the child placed therein. For example, the two side supports 40 can move transversally away from each other to increase the transversal distance W for a child of a greater size, and can move transversally toward each other to reduce the transversal distance W for a child of a smaller size.

According to an example of construction, the two side supports 40 can be slidably connected with the backrest portion 30 for sliding movements along a transversal axis extending from the left side to the right side of the backrest portion 30. For example, each side support 40 can have a coupling portion 40A that is slidably connected with the backrest portion 30, and a supporting portion 40B that is fixedly connected with the coupling portion 40A and protrudes forward from the backrest portion 30. According to an example of construction, the coupling portion 40A and the supporting portion 40B may be formed as two panels connected with each other, the supporting portion 40B extending at an angle from the coupling portion 40A. At each of the left and right side of the backrest portion 30, the side support 40 can slide transversally to displace the supporting portion 40B toward or away from an outer side edge 30E of the backrest portion 30 for adjusting the transversal distance W.

Referring to FIGS. 2 and 3, each side support 40 can be coupled to the backrest portion 30 via a sliding connection, which can include, e.g., at least one rod 32 fixedly connected with the backrest portion 30, and at least one guide slot 43 provided on the side support 40 through which the rod 32 is slidably received. According to an example of construction, the coupling portion 40A of each side support 40 can be arranged to overlap and slide generally parallel to a surface 30A of the backrest portion 30, the rod 32 can be fixedly connected with the surface 30A of the backrest portion 30, and the guide slot 43 can be provided on the coupling portion 40A of the side support 40.

In the illustrated example of FIGS. 2 and 3, the coupling portion 40A of each side support 40 has two guide slots 43 vertically distant from each other through which two corresponding rods 32 fixedly connected with the backrest portion 30 are respectively received. However, more of the guide slots 43 and rods 32 may be provided for slidably connecting each side support 40 with the backrest portion 30.

It will be appreciated that the sliding connection between the backrest portion 30 and the side support 40 is not limited to the illustrated embodiment. For example, rather than having the rod 32 fixedly connected with the backrest portion 30 and placing the guide slot 43 on the coupling portion 40A of the side support 40, the sliding connection between the backrest portion 30 and the side support 40 may alternately have the rod 32 fixedly connected with the coupling portion 40A of the side support 40 and place the guide slot 43 on the surface 30A of the backrest portion 30.

As the side support 40 moves transversally relative to the backrest portion 30, the rod 32 can be guided to slide along the corresponding guide slot 43. The sliding connection comprised of the rod 32 and the guide slot 43 can guide sliding movements of the side support 40 and assist in limiting the course of the side support 40 relative to the backrest portion 30.

Referring to FIGS. 1-3, the transversal movement of the two side supports 40 may be linked to the vertical movement of the headrest 20 for facilitating the adjustment of the child safety seat 1 in accordance with the size of a child. To this purpose, the child safety seat 1 can include a linking mechanism 10 adapted to movably link each of the two side supports 40 to the headrest 20. In this manner, a vertical movement of the headrest 20 relative to the backrest portion 30 can cause the two side supports 40 to concurrently move transversally relative to the backrest portion 30 so that the height of the headrest 20 and the transversal distance W between the two side supports 40 can be adjusted in parallel.

According to an example of construction, the linking mechanism 10 can movably couple each side support 40 to the headrest 20 via a sliding connection. For example, the linking mechanism 10 can include two rod portions 12 carried with the headrest 20, and two ramped slots 42 respectively provided on the two side supports 40. The two ramped slots 42 can be respectively provided on the coupling portions 40A of the two side supports 40. According to an example of construction, the two ramped slots 42 can be substantially symmetric to each other relative to a central longitudinal axis S of the backrest portion 30. The central longitudinal axis S can be defined as an axis that extends from a bottom to a top of the backrest portion 30 and is equidistant to the two outer side edges 30E at the left and right sides of the backrest portion 30. The two ramped slots 42 can approach each other as they extend upward along the central longitudinal axis S.

The two rod portions 12 move along with the headrest 20 during height adjustment of the headrest 20, and are respectively connected slidably with the two ramped slots 42 of the two side supports 40. According to an example of construction, the two rod portions 12 may be fixedly connected with the headrest 20 and respectively received through the two ramped slots 42 of the two side supports 40. As the headrest 20 moves relative to the backrest portion 30 for height adjustment, the two rod portions 12 can respectively slide along the two ramped slots 42 of the two side supports 40. Owing to the sliding connection between the rod portions 12 and the ramped slots 42, the two side supports 40 and the headrest 20 can move concurrently relative to the backrest portion 30. For example, the two side supports 40 can slide transversally away from each other while the headrest 20 slides upward, and can slide transversally toward each other while the headrest 20 slides downward. Accordingly, the height of the headrest 20 and the transversal distance W between the two side supports 40 can be adjusted in a concurrent manner.

As children grow differently in size, it may be desirable to provide different stages of adjustments for the headrest 20 and the side supports 40. For example, the child safety seat 1 may have a first stage of adjustment in which the headrest 20 is movable for height adjustment while the two side supports 40 remain in position relative to the backrest portion 30, and a second stage of adjustment in which the headrest 20 and the two side supports 40 are movable concurrently relative to the backrest portion 30 for adjustment. The height of the headrest 20 can be higher in the second stage of adjustment than in the first stage of adjustment.

Referring to FIGS. 2 and 3, the linking mechanism 10 can be configured to provide the aforementioned two stages of adjustment for the headrest 20 and the side supports 40. More specifically, each ramped slot 42 can have two slot portions 42A and 42B connected with each other that extend in different directions. For example, the slot portion 42A can have a substantially straight shape extending generally parallel to the central longitudinal axis S of the backrest portion 30, and the slot portion 42B can be tilted relative to the slot portion 42A. According to an example of construction, the slot portion 42B can be located above the slot portion 42A and tilted inward (i.e., toward a center region of the backrest portion 30) relative to the slot portion 42A. A course of the rod portion 12 along the slot portion 42A corresponds to the first stage of adjustment, i.e., the headrest 20 is movable for height adjustment while the side support 40 remains in position relative to the backrest portion 30. A course of the rod portion 12 along the slot portion 42B corresponds to the second stage of adjustment, i.e., the headrest 20 and the side support 40 are movable concurrently relative to the backrest portion 30 for concurrently adjusting the height of the headrest 20 and the transversal distance W between the two side supports 40.

In the first stage of adjustment, the two rod portions 12 can respectively travel along the slot portions 42A of the two ramped slots 42 as the headrest 20 slides relative to the backrest portion 30 for height adjustment, and the two side supports 40 can remain in position relative to the backrest portion 30 to keep a smallest transversal distance W between the two side supports 40. In the second stage of adjustment, the two rod portions 12 can respectively travel along the slot portions 42B of the two ramped slots 42 as the headrest 20 and the two side supports 40 move concurrently relative to the backrest portion 30 for adjustment: for example, the two side supports 40 can move along with the headrest 20 to gradually increase the transversal distance W when the headrest 20 slides upward, and can move along with the headrest 20 to gradually reduce the transversal distance W when the headrest 20 slides downward. A greatest transversal distance W between the two side supports 40 can be obtained when the two rod portions 12 reach the ends of the slot portions 42B.

Figure 4:
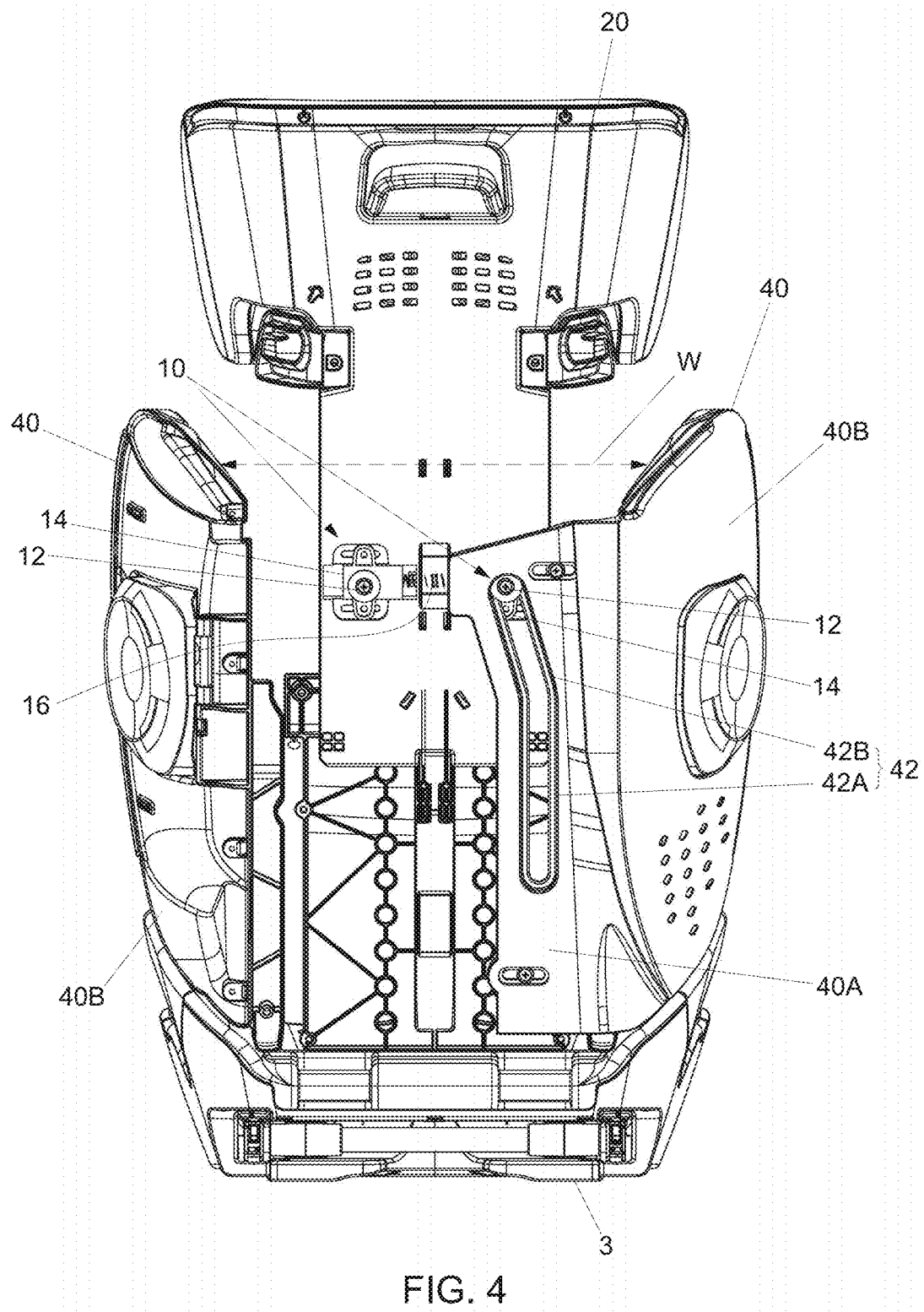
FIG. 4 is a schematic view illustrating an embodiment of the linking mechanism configured to movably couple each of the two side supports to the headrest and also allow transversal movements of the two side supports relative to the backrest portion while the headrest remains in position relative to the backrest portion.
Figure 5:
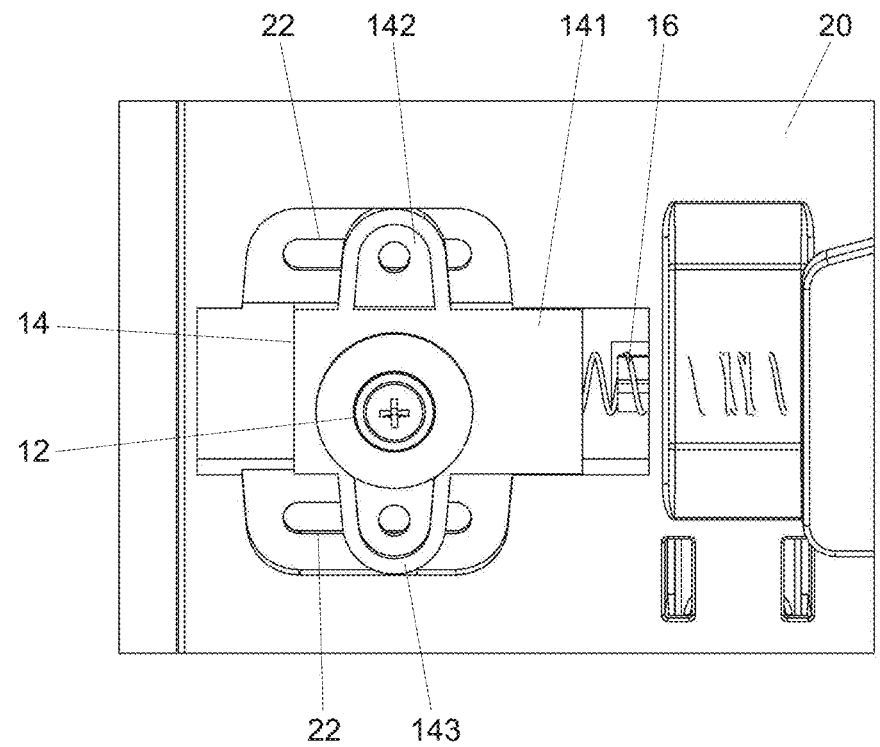
FIG. 5 is an enlarged view illustrating some construction details of the linking mechanism shown in FIG. 4.

In certain circumstances, it may further be desirable to allow adjustment of the transversal distance W between the two side supports 40 without movement of the headrest 20. For example, when the child safety seat 1 is not used and the headrest 20 is locked in a highest position relative to the backrest portion 30, the two side supports 40 could be arranged to reduce the transversal distance W so that the child safety seat 1 is more compact for easy storage or transport. In this regard, FIGS. 4 and 5 are schematic views illustrating an embodiment of the linking mechanism 10 configured to movably couple each of the two side supports 40 to the headrest 20 as described previously, and also allow transversal movements of the two side supports 40 relative to the backrest portion 30 while the headrest 20 remains in position relative to the backrest portion 30. In FIG. 4, the coupling portion 40A of one of the two side supports 40 is omitted to better show construction details of the linking mechanism 10.

Referring to FIGS. 4 and 5, the linking mechanism 10 can likewise movably link each side support 40 to the headrest 20 via a sliding connection comprised of the rod portion 12 carried with the headrest 20 and the ramped slot 42 provided on the side support 40. In the example of FIGS. 4 and 5, the linking mechanism 10 further includes two carrier parts 14 that are respectively connected fixedly with the two rod portions 12 and are movably coupled to the headrest 20, whereby the carrier parts 14 and the rod portions 12 coupled thereto are movable relative to the headrest 20. According to an example of construction, each of the two rod portions 12 and the corresponding carrier part 14 may be attached to each other via a fastener. According to another example of construction, each of the two rod portions 12 and the corresponding carrier part 14 may be formed integrally as a single part.

Each of the two carrier parts 14 can be connected with the headrest 20 for sliding movements along a transversal axis extending from the left side to the right side of the headrest 20. According to an example of construction, each carrier part 14 can have a base portion 141 to which the corresponding rod portion 12 is fixedly attached, and two protruding portions 142 and 143 respectively connected with the base portion 141 at two opposite sides thereof. The two protruding portions 142 and 143 can be respectively connected slidably with two parallel guide slots 22 provided on the headrest 20 so that the carrier part 14 and the rod portion 12 carried thereon can slide transversally relative to the headrest 20.

Referring to FIGS. 4 and 5, the linking mechanism 10 can further include one or more resilient part 16 configured to apply a biasing force that opposes inward movements of the two side supports 40 for reducing the transversal distance W. In the illustrated example, the one or more resilient part 16 can movably bias each of the two carrier parts 14 and the corresponding rod portion 12 in an outward direction away from a center region of the headrest 20, i.e., which displaces the two rod portions 12 transversally away from each other. Since the two rod portions 12 are respectively connected slidably with the two ramped slots 42, the biasing force of the one or more resilient part 16 can oppose inward movements of the two side supports 40 that would reduce the transversal distance W.

According to an example of construction, two resilient parts 16 can be provided, which are respectively connected with the two carrier parts 14. The resilient parts 16 include, without limitation, springs. Each of the two resilient parts 16 can have an end connected with the corresponding carrier part 14 and another end connected with the headrest 20. The biasing force applied by each resilient part 16 can oppose an inward movement of the corresponding side support 40.

The linking mechanism 10 of FIGS. 4 and 5 can movably link each of the two side supports 40 to the headrest 20 and provide the two stages of adjustment for the headrest 20 and the side supports 40 as previously described. In the first stage of adjustment, the two rod portions 12 can respectively travel along the slot portions 42A of the two ramped slots 42 as the headrest 20 slides relative to the backrest portion 30 for height adjustment, and the two side supports 40 can remain in position relative to the backrest portion 30 to keep a smallest transversal distance W between the two side supports 40. In the second stage of adjustment, the two rod portions 12 can respectively travel along the slot portions 42B of the two ramped slots 42 as the headrest 20 and the two side supports 40 move concurrently relative to the backrest portion 30 for adjustment.

Moreover, the linking mechanism 10 of FIGS. 4 and 5 allows transversal movements of the two side supports 40 independent of the headrest 20 for modifying the transversal distance W. For example, while the headrest 20 is kept in position relative to the backrest portion 30 in the second stage of adjustment (e.g., at an uppermost position), the two side supports 40 may be urged to move inward relative to the backrest portion 30 toward each other for reducing the transversal distance W between the two side supports 40, which can overcome the biasing force of the resilient parts 16 and cause the two rod portions 12 to slide transversally toward each other relative to the headrest 20. By reducing the transversal distance W between the two side supports 40, the child safety seat 1 can be more compact for easy storage or transport.

According to an example of construction, a locking mechanism may be added to hold and release the two rod portions 12 with respect to the headrest 20. For example, the locking mechanism may be configured to engage with the two carrier parts 14 to hold the two rod portions 12 in position relative to the headrest 20, and disengage from the two carrier parts 14 to allow transversal sliding movements of the two rod portions 12 relative to the headrest 20. After the two side supports 40 are moved toward each other independent of the headrest 20 for reducing the transversal distance W, the locking mechanism can be engaged to hold the two rod portions 12 in position relative to the headrest 20, which can oppose the biasing force of the two resilient parts 16 and retain the two side supports 40 in position relative to the backrest portion 30. When the two side supports 40 need to be expanded, the locking mechanism can be disengaged, and the biasing force of the two resilient parts 16 can urge the two rod portions 12 to move away from each other and thereby urge the two side supports 40 to move relative to the backrest portion 30 away from each other.

Although the foregoing has described examples in which the rod portions 12 are carried with the headrest 20 and the ramped slots 42 are provided on the side supports 40, it will be appreciated that the linking mechanism 10 is not limited to the illustrated examples. According to a variant construction, the two rod portions 12 may be respectively carried with the two side supports 40 and the headrest 20 can have two ramped slots respectively connected slidably with the two rod portions 12, which can provide a linking mechanism that can likewise movably link the two side supports 40 to the headrest 20 and operate like described previously. In such a variant construction, each of the two ramped slots on the headrest can likewise have two slot portions that extend in different directions, a first one of the two slot portions having a substantially straight shape that extends generally parallel to the central longitudinal axis S of the backrest portion, and a second one of the two slot portions being located below the first slot portion and tilted outward relative to the first slot portion.

In a construction where the two rod portions 12 are respectively carried with the two side supports 40 rather than the headrest 20, the carrier part 14 and resilient part 16 shown in FIG. 5 may further be provided on each side support 40 to allow transversal movements of the side support 40 independent of the headrest 20 for modifying the transversal distance W. More specifically, the carrier part 14 can be connected fixedly with the rod portion 12 and slidably connected with the side support 40 for transversal movements relative to the side support 40, and the resilient part 16 can be respectively connected with the carrier part 14 and the side support 40 and can apply a biasing force that opposes an inward movement of the side support 40.

Advantages of the child safety seat described herein include the ability to transversally move the two side supports at the left and right side of the backrest portion so that a width of the receiving space where a child is seated can be adjusted in accordance with the size of the child. Moreover, the two side supports can be movably linked to the headrest of the child safety seat so that the side supports and the headrest are movable concurrently for convenient adjustment.

Realization of the child safety seat has been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A child safety seat comprising:
   a seat portion and a backrest portion connected with each other;
   a headrest slidably connected with the backrest portion;
   a first and a second side support connected with the backrest portion and respectively protruding forward from the backrest portion at two sides thereof, the first and second side supports being configured to be movable relative to the backrest portion for modifying a transversal distance between the first side support and the second side support; and
   a linking mechanism configured to movably link each of the first and second side supports to the headrest so that the headrest and the first and second side supports are movable concurrently relative to the backrest portion for adjustment and to allow transversal movements of the first and second side supports relative to the backrest portion while the headrest remains in position relative to the backrest portion.

2. The child safety seat according to claim 1, wherein each of the first and second side supports extends from a top of the backrest portion to a bottom of the backrest portion.

3. The child safety seat according to claim 1, wherein each of the first and second side supports includes a coupling portion slidably connected with the backrest portion, and a supporting portion that is fixedly connected with the coupling portion and protrudes forward from the backrest portion.

4. The child safety seat according to claim 3, wherein the coupling portion and the supporting portion are formed as two panels connected with each other, the supporting portion extending at an angle from the coupling portion.

5. The child safety seat according to claim 3, wherein the coupling portion of the first side support is arranged to overlap and slide generally parallel to a surface of the backrest portion, one of the surface of the backrest portion and the coupling portion of the first side support being fixedly connected with a rod, and the other one of the surface of the backrest portion and the coupling portion of the first side support having a guide slot through which the rod is slidably received.

6. The child safety seat according to claim 1, wherein the linking mechanism movably couples each of the first and second side supports to the headrest via a sliding connection.

7. The child safety seat according to claim 6, wherein the linking mechanism includes a rod portion provided on one of the headrest and the first side support, and a ramped slot provided on the other one of the headrest and the first side support, the rod portion being slidably connected with the ramped slot.

8. The child safety seat according to claim 7, wherein the ramped slot has a first and a second slot portion connected with each other that extend in different directions.

9. The child safety seat according to claim 8, wherein a course of the rod portion along the first slot portion corresponds to a first stage of adjustment where the headrest is movable for height adjustment while the first side support remains in position relative to the backrest portion, and a course of the rod portion along the second slot portion corresponds to a second stage of adjustment where the headrest and the first side support are movable concurrently relative to the backrest portion.

10. The child safety seat according to claim 8, wherein the first slot portion has a substantially straight shape extending generally parallel to a central longitudinal axis of the backrest portion.

11. The child safety seat according to claim 10, wherein the second slot portion is tilted relative to the first slot portion.

12. The child safety seat according to claim 11, wherein the second slot portion is located above the first slot portion and is tilted toward a center region of the backrest portion.

13. The child safety seat according to claim 1, wherein the linking mechanism includes a carrier part that is connected fixedly with a rod portion and slidably connected with one of the headrest and the first side support, and a ramped slot provided on the other one of the headrest and the first side support, the rod portion being slidably connected with the ramped slot.

14. The child safety seat according to claim 13, wherein the ramped slot has a first and a second slot portion connected with each other that extend in different directions.

15. The child safety seat according to claim 14, wherein a course of the rod portion along the first slot portion corresponds to a first stage of adjustment where the headrest is movable for height adjustment while the first side support remains in position relative to the backrest portion, and a course of the rod portion along the second slot portion corresponds to a second stage of adjustment where the headrest and the first side support are movable concurrently relative to the backrest portion.

16. The child safety seat according to claim 14, wherein the first slot portion has a substantially straight shape extending generally parallel to a central longitudinal axis of the backrest portion.

17. The child safety seat according to claim 16, wherein the second slot portion is tilted relative to the first slot portion.

18. The child safety seat according to claim 13, wherein the linking mechanism further includes a resilient part connected with the carrier part, the resilient part being configured to apply a biasing force that opposes an inward movement of the first side support for reducing the transversal distance between the first side support and the second side support.

* * * * *